(No Model.)

W. C. CROWE.
CORN SHOCKER.

No. 597,710. Patented Jan. 25, 1898.

Witnesses
E. J. Nottingham
G. F. Downing

Inventor
W. C. Crowe
By H. A. Seymour
Attorney

THE NORRIS PETERS CO., PHOTO-LITHO., WASHINGTON, D. C.

UNITED STATES PATENT OFFICE.

WILLIAM C. CROWE, OF MASONVILLE, IOWA.

CORN-SHOCKER.

SPECIFICATION forming part of Letters Patent No. 597,710, dated January 25, 1898.

Application filed November 16, 1895. Serial No. 569,185. (No model.)

*To all whom it may concern:*

Be it known that I, WILLIAM C. CROWE, a resident of Masonville, in the county of Delaware and State of Iowa, have invented certain new and useful Improvements in Corn-Shockers; and I do hereby declare the following to be a full, clear, and exact description of the invention, such as will enable others skilled in the art to which it appertains to make and use the same.

My invention relates to an improvement in corn-harvesters, and more particularly to an improved shocker, the object of the invention being to produce means for shocking corn and depositing the shocks onto the ground, which means shall be simple in construction, easy to manipulate, comparatively cheap to manufacture, and effectual in all respects in the performance of their functions.

With these objects in view the invention consists in certain novel features of construction and combinations and arrangements of parts, as hereinafter set forth, and pointed out in the claims.

Figure 1:
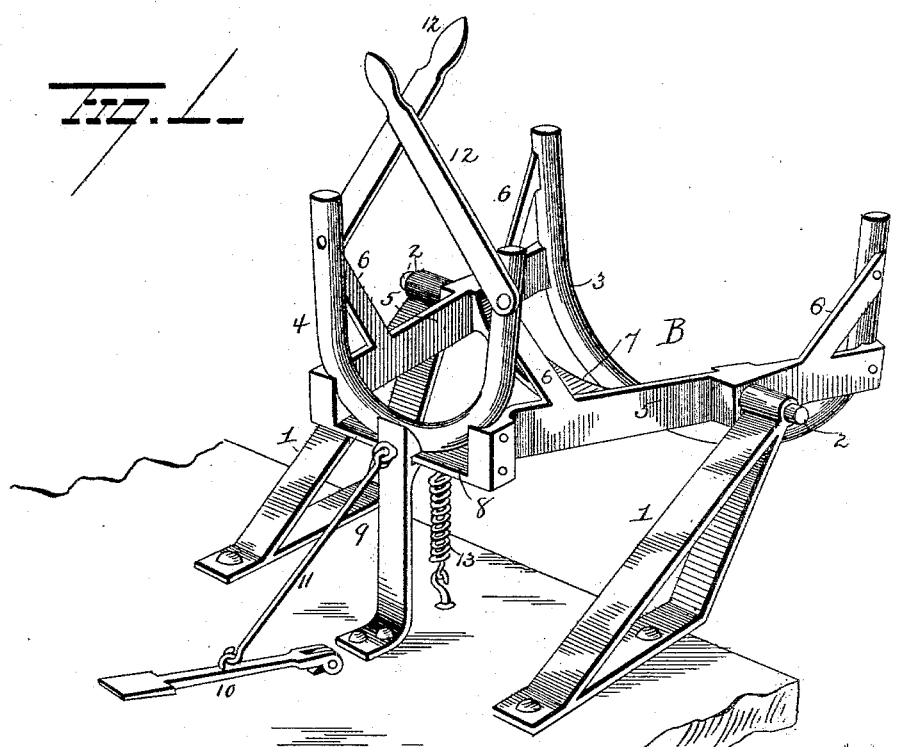
Figure 2:
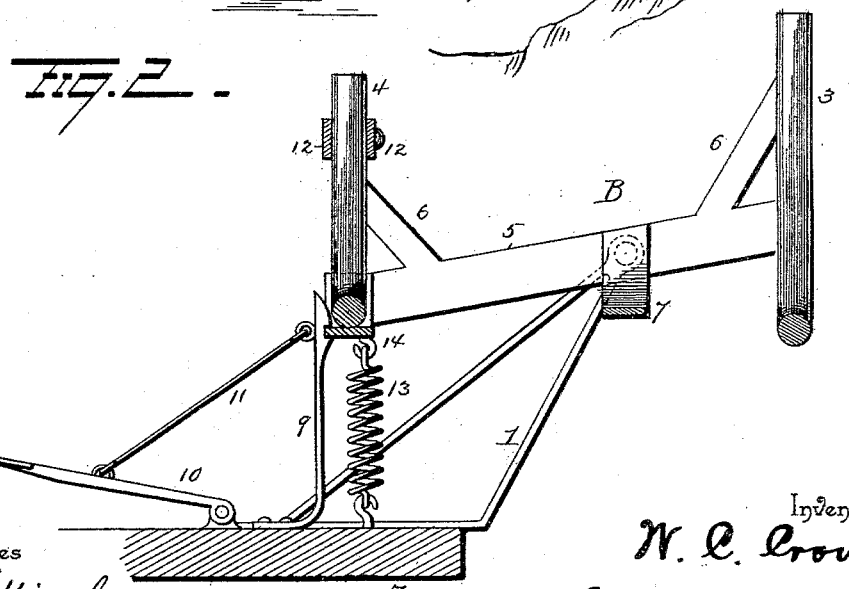

In the accompanying drawings, Figure 1 is a view of my improved shocker. Fig. 2 is a sectional view of the same.

A represents a portion of the frame of a corn-harvester, on which brackets or standards 1 1 are secured. Between these brackets or standards my improved shocker B is located and provided with trunnions 2 2, loosely mounted in the upper ends of said brackets or standards. The shocker comprises two U-shaped bars 3 4, one considerably larger than the other; arms 5, connecting said bars, from which arms the trunnions 2 project; braces 6, connecting the arms and bars, and a curved brace or strap 7, connecting the arms 5 at points between the ends of the latter. The arms 5 are also preferably connected at their inner ends by a cross-bar 8. The shocker B is thus made trough-shaped for the reception of the grain, which is so placed therein that the butt-ends of the stalks will rest in the larger U-shaped bar 3 and the heads of the stalks in the smaller U-shaped bar 4. The trough-shaped shocker-frame will be maintained normally in a horizontal position by means of a spring-catch 9, which normally engages the cross-bar 8, and the said spring-catch is adapted to be operated by means of a foot-lever 10, connected with the catch by means of a rod 11. Compressing-levers 12 12 are pivotally connected to the arms of the U-shaped bar 4 and project transversely across the same in opposite directions, one of said levers being connected to the front face of one arm of the bar 4 and the other lever being connected to the rear face of the other arm. A spring 13 is connected at one end to an eye 14 on the smaller end of the shocker and at the other end to the harvester-frame.

The stalks of corn will be placed in the trough-shaped frame B, with their larger or butt ends supported in the U-shaped bar 3 and their smaller ends supported in the U-shaped bar 4, as above explained. When the trough shall have become filled, the levers 12 will be operated to compress the shock at a point below or in rear of the head thereof, and then the shock will be tied with a cord, wire, or other device. The levers will then be raised and the foot-lever operated to release the frame. The butt-end of the shock being much heavier than the head therein, as soon as the frame B is released it will turn on its fulcrum and assume a vertical position, depositing the shock in a standing position on the ground. When the shock shall have been thus released, the shocking-frame B will be made to assume its normal horizontal position in engagement with the spring-catch by means of the spring 13, ready to receive another supply of grain.
The arms 5 converge toward their inner ends to correspond to the difference in width of the U-shaped bars or receivers 3 and 4 and incline from the horizontal at their outer ends when the shocker is in position to receive the stalks, being attached at their inner ends to the terminals of the cross-bar 8 and at their outer ends to the arms of the receiver 3 between their ends. The parts 6 serve as braces and side guards to prevent lateral displacement of short stalks.

My improvements are very simple in construction and effectual in the performance of their functions.

Slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In combination, outwardly-divergent side arms pivoted in transverse alinement nearer their outer ends and normally inclining from the horizontal, U-shaped receivers of different size, the smaller being attached at its lower end to the converging ends of the said arms, and the larger between its ends to the diverging terminals of the aforesaid arms, a cross-bar joining the inner ends of the arms and touching the lower end of the inner receiver at a medial point, a downwardly-curved brace connecting the arms about in line with their pivotal supports, and braces connecting the upper ends of the members of the receivers with the arms, substantially as shown for the purpose described.

2. In combination, U-shaped receivers of different size, inclined and divergent side arms secured at their outer extremities to the larger receiver between its upper and lower ends and at their inner extremities to the lower end of the smaller receiver, and pivotally supported near their outer terminals, braces connecting the arms with the members of the receivers, and compressing-levers pivoted to the upper end portions of the members of the inner receiver upon opposite faces and extending in opposite directions, substantially as shown and described.

3. The herein-described means for shocking stalks, consisting of a platform, standards secured at their lower ends to the platform and inclining outwardly at their upper ends, inclined and divergent side arms fulcrumed near their outer ends to the upper ends of the standards, U-shaped receivers of different size secured, the smaller at its lower end and the larger about midway of its ends, to, respectively, the inner and the outer extremities of the said side arms, braces between the side arms and the members of the receivers, a cross-bar joining the inner ends of the arms and touching the lower end of the inner receiver, a downwardly-curved brace connecting the arms about in line with their pivotal supports, a spring between the platform and cross-bar, a spring-catch to engage with the said cross-bar and hold the shocker in normal position, a foot-lever mounted upon the platform and having connection with the spring-catch, and compressing-levers extending in opposite directions and pivoted to opposite faces of the members of the inner U-shaped receiver, substantially as shown and for the purpose set forth.

In testimony whereof I have signed this specification in the presence of two subscribing witnesses.

WM. C. CROWE.

Witnesses:
J. B. ENGSTROM,
T. E. SIMMONS.